July 7, 1959 V. W. BOLIE 2,894,133

TUNING SYSTEM FOR FREQUENCY SYNTHESIZING MEANS

Filed April 24, 1957 4 Sheets-Sheet 1

INVENTOR.
VICTOR W. BOLIE
BY
Moody and Goldman
ATTORNEYS

July 7, 1959 V. W. BOLIE 2,894,133

TUNING SYSTEM FOR FREQUENCY SYNTHESIZING MEANS

Filed April 24, 1957 4 Sheets-Sheet 2

INVENTOR.
VICTOR W. BOLIE
BY Moody and Goldman
ATTORNEYS

TUNING SYSTEM FOR FREQUENCY SYNTHESIZING MEANS

Filed April 24, 1957 4 Sheets-Sheet 3

INVENTOR.
VICTOR W. BOLIE
BY Moody and Goldman
ATTORNEYS

INVENTOR.

VICTOR W. BOLIE

BY Moody and Goldman

ATTORNEYS

United States Patent Office 2,894,133

Patented July 7, 1959

2,894,133

TUNING SYSTEM FOR FREQUENCY SYNTHESIZING MEANS

Victor W. Bolie, Cedar Rapids, Iowa, assignor to Collins Radio Company, Cedar Rapids, Iowa, a corporation of Iowa Application April 24, 1957, Serial No. 654,913

11 Claims. (Cl. 250—27)

This invention relates generally to precision-tuning means utilizable in frequency synthesizing means of the types described and claimed in Patent No. 2,829,255 of Victor W. Bolie, issued April 1, 1958 and patent application Serial No. 575,379 of John W. Smith filed April 2, 1956, both assigned to the assignee of the present invention.

These types of frequency synthesizing means each uses a plurality of digital-dividing units and a harmonic generator that obtains a given set of harmonics from a fixed-stable frequency source, such as a crystal oscillator. Such synthesizing means permits the generation of a large number of frequencies from the fixed-frequency source, while enabling a direct digital indication of the output frequency. Furthermore, such synthesizing means has virtually infinite resolution of its output frequencies; that is, it permits the increment between adjacent output frequencies to be as small as required, being limited in practice only by the stability of the reference source. Prior frequency synthesizing means have been unable to obtain such resolution. Furthermore, all digital-dividing units in such synthesizing means can be constructed identically, except for the first. Accordingly, the production of such synthesizing means is greatly simplified.

The digital read-out of the synthesized frequency can be to as many numerical digits as desired, each digital unit providing direct control over a respective digit in the read-out indication.

Patent application Serial No. 575,379, cited above, provides an improvement in the basic Patent No. 2,829,255 cited above, and teaches that the total number of digital-dividing units in such synthesizing means can be substantially reduced without loss of stability or performance by replacing the first digital unit of the prior application with a variable-frequency oscillator. Furthermore, it teaches how a suitable digital calibration of the variable oscillator fits directly into the digital indications provided by the digital units to retain a direct frequency read-out.

Briefly, each digital-dividing unit in the cited applications comprises a single-pole switch with plural-stator contacts connected to respective harmonics of the fixed-source frequency as provided by a harmonic generator. Each dividing unit, except an initial one, includes a mixer that has one input connected to the pole of its switch and has its other input connected to the output of the adjacent prior digital unit. A filter receives the output of the mixer to pass its first-order-summed-output frequency. A frequency divider divides the filtered frequency by the radix of the number system chosen to provide the frequency read-out, which is ten in the generally preferred decade system. A second filtering means receives the divider output and attenuates its harmonic content to provide the output of the digital unit.

Each digital unit includes a tuning shaft which controls one digit in the output-frequency indication. The tuning shaft of the unit positions its switch to select one of the generated harmonics, and it also controls the tuning of the filters in the unit.

However, the tuning of the filters in a given digital unit is also effected to a lesser extent by the tuning of all prior digital units.

The above-cited patent applications also teach how a plurality of differential transmissions can be connected to the digital units to convey the tuning information of prior units to a given unit in order to obtain precise tuning of the given unit. The differential-transmissions combine the settings of prior units with the setting of a given unit.

This invention teaches how the tuning accuracy of the filters within a given unit may be increased to another numerical order than is obtainable from the tuning shaft of the given unit. Thus, mechanical-differential units can be eliminated, while maintaining sufficient tuning precision to satisfy most practical cases.

In most practical cases involving low, medium, and high frequency ranges, the bandwidths of filters are limited by the Q's of lumped constant inductances, which might be of the order of 100. However, the required order of tuning accuracy for any filter in such synthesizing means is limited by the filter's bandwidth.

The shaft of the adjacent-prior digital unit provides the next higher order of tuning information in such synthesizing means. This is realized by considering a decade synthesizing means. Thus, any of its digital units receives a frequency from its adjacent-prior unit that is of the order of one-tenth of the harmonic frequency received by the given unit, due to the frequency division by ten in the prior unit.

Consequently, filters with Q's of the order of 100 have a sufficiently narrow bandwidth to have their filtering operation affected by the second-order control obtainable from the setting of its adjacent-prior unit, but are not sufficiently selective to be greatly affected by further higher orders of tuning information.

This invention provides an electronic filter arrangement which is controlled by the tuning shafts of both its given unit and its prior-adjacent unit. Also, the invention provides a filter arrangement which simplifies the over-all construction of such synthesizing means while obtaining a required amount of tuning precision.

Thus, each filter in the second and any following digital unit in a synthesizing means is comprised of a parallel-resonant circuit having a particular arrangement of capacitance and inductance components with a unique mechanical tie-in between adjacent digital units. Such a parallel-resonant filter includes a first leg with an inductor and capacitor connected in series, a second leg with a second capacitor connected across the first leg, and a third leg with a third capacitor connected across the second capacitor. The first and second capacitors are controlled by the tuning shaft of the digital unit having the respective filter, and the third capacitor is controlled by the tuning shaft of the adjacent-prior digital unit. The three capacitors are adjustable in value by discrete settings which coordinate with the digital settings of the units. Thus, in a decade type of such synthesizing means, there will be ten discrete settings provided with each unit. Also, the three capacitors in each of its filters may be variable to any of ten settings; or each capacitor may be represented by a bank of ten capacitors which are respectively selectable to provide the required discrete capacitances. The particular variation requirements by this invention for the three adjustable capacitances in each filter is explained below.

Further objects, features and advantages of this invention will be apparent to a person skilled in the art upon thorough study of this specification and the accompanying drawings in which.

Figure 1:
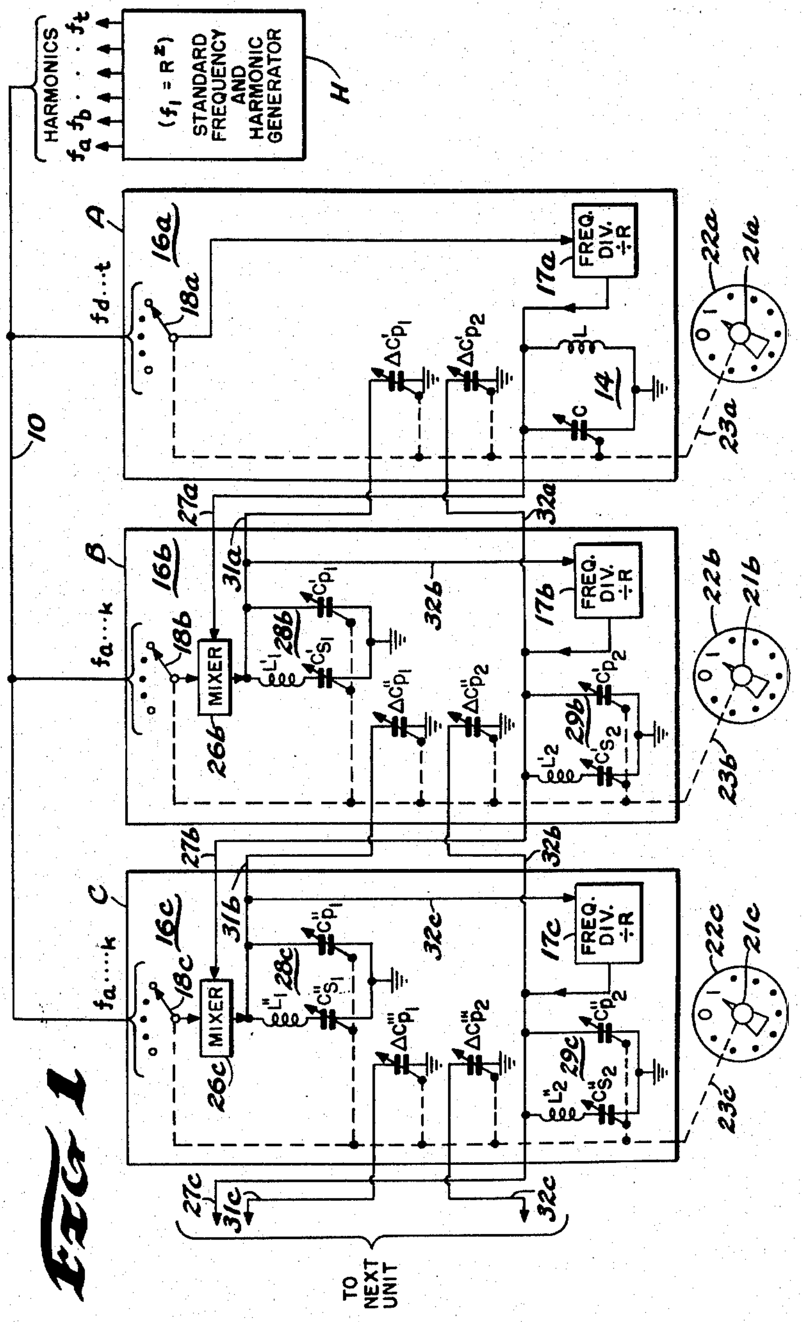
Figure 1 illustrates schematically filters made according to this invention in several digital-dividing units of a synthesizing means.

Specific embodiments of the invention will now be given. Figure 1 illustrates the first, second and third digital units A, B and C of a digital frequency synthesizing means. There is also included a harmonic-frequency generator H which has a stable source providing a standard frequency $f_1$, which might be a temperature-stabilized crystal oscillator. To enable digital representation in a number system having a radix R, frequency $f_1$ should be equal to $R^z$, where $z$ is an integer. Generator H provides a set of harmonics $f_a \ldots f_t$ of frequency $f_1$. Each harmonic of the set is provided over a separate shielded lead (not shown), but such a set of leads is represented by line 10. The set of harmonics $f_a$ through $f_t$ are defined as follows:

$$\text{Lowest harmonic } a \text{ in the set} = M(R-1) \quad (1)$$

$$\text{Highest harmonic } t \text{ in the set} = (M+1)R-1 \quad (2)$$

in which M is a design factor and is any integer, although preferably not zero.

The above-defined set of harmonics is divided into two groups $f_{a \ldots k}$ and $f_{d \ldots t}$. The group $f_{a \ldots k}$ represents R number of consecutive harmonics in which the lowest is defined by Expression 1 above. The group $f_{d \ldots t}$ represents R number of consecutive harmonics in which the highest is defined by Expression 2 above.

The first dividing unit in a digital-frequency synthesizing means receives the group $f_{d \ldots t}$; and the second and each following digital unit receives the group $f_{a \ldots k}$. This is explained in more detail in Patent No. 2,829,255 cited above, which was invented by the same inventor as the present invention.

Figure 2:
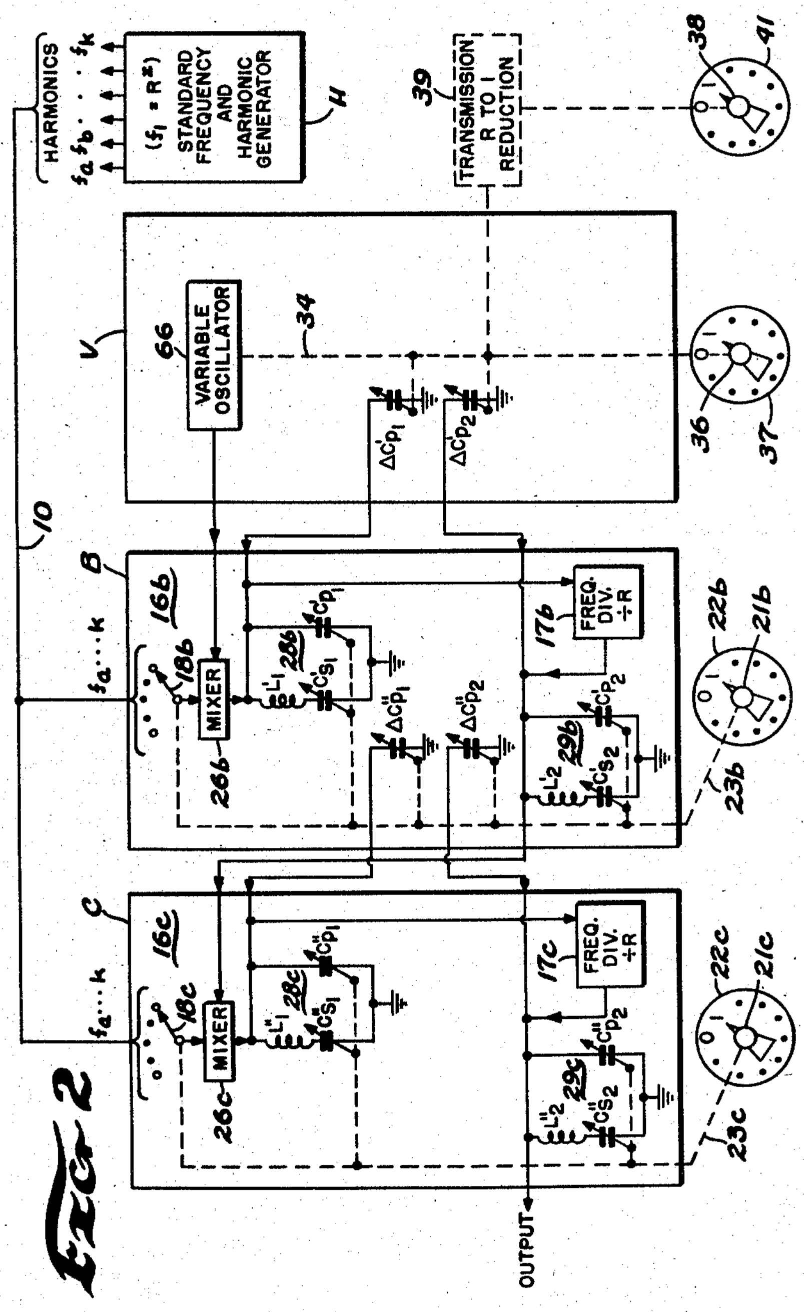
Figure 2 shows schematically filters made according to this invention in digital-dividing units of another type of synthesizing means.

However, in the case of the variable-frequency synthesizing means explained in more detail in patent application Serial No. 575,379, a variable oscillator is provided in the place of first dividing unit A. Figure 2 shows such a synthesizing means utilizing the invention. Its harmonic generator H need provide only the harmonic group $f_{a \ldots k}$.

A single-pole switch 16 having R number of stator contacts is provided with each digital unit. The contacts in unit A are respectively connected to the leads 10 carrying harmonic frequencies $f_{d \ldots t}$. Similarly, the contacts of switch 16 in the second and each following unit are connected to the leads 10 carrying harmonic frequencies $f_{a \ldots k}$. Thus, the position of the pole 18 of each switch 16 determines which harmonic is received by its digital unit. First unit A has a frequency divider **17*a* connected to the pole of its switch 16*a*. A parallel-resonant filter 14 (which is not part of this invention) is connected to the output of divider 17*a* and provides the output frequency of unit A. Filter 14 includes a fixed inductance L and a variable capacitor C. A tuning shaft 23*a* is provided with unit A. It is connected to pole 18*a* and to variable capacitor C. A knob 21*a* is connected to shaft 23*a*. A dial 22*a* is associated with knob 21*a* and indicates the basic digits in the chosen numerical system having the radix R. Hence, R number of discrete positions are provided for shaft 23*a*** and capacitor C. R will generally be ten, since the decade numerical system will generally be preferred. However, synthesizing means of this type is not limited to the decade system and R may be the base of any number system.

The second and each following digital-dividing unit includes a frequency mixer 26 which has one input connected to pole 18 of its switch 16. Each mixer 26 has its other input connected by a lead 27 to the output of its adjacent-prior digital unit. Each unit is directly controlled by a knob 21 coupled to a control shaft 23 and associated with a dial plate 22 which is calibrated in the same manner as dial **22*a***.

This invention concerns the filters in the second and following digital units.

All components associated with the filters of unit B are designated by a single prime (′); and all components associated with the filters of unit C are designated by a double prime (″). Furthermore, there are two filters 28 and 29 in the second and each following unit, wherein the components associated with first filter 28 are designated by the subindex 1, and the components associated with second filter 29 are designated by the subindex 2. Each filter is a parallel-resonant network.

The first filter in each second and following digital unit is connected to the output of mixer 26. Thus, the first filter **28*b* in unit B includes the components $L_{s1}'$, $C_{s1}'$, $C_{p1}'$ and $\Delta C_{p1}'$. Inductor $L_1'$ and variable capacitor $C_{s1}'$ are connected in series between the output of mixer 26*b*** and ground. Second capacitor $C_{p1}'$ is also connected between the mixer output and ground, and third capacitor $\Delta C_{p1}'$ is connected in parallel with capacitor $C_{p1}'$.

Tuning shaft **23*b* in unit B is coupled to capacitors $C_{s1}'$ and $C_{p1}'$. Capacitor $\Delta C_{p1}'$ is situated in adjacent-prior unit A and is coupled to its tuning shaft 23*a*. A lead 31*a*** connects capacitor $\Delta C_{p1}'$ to $C_{p1}'$.

The input to frequency divider **17*b* is connected by lead 32*b*, to the output of first filter 28*b*. The output of divider 17*b* is received by a second filter 29*b*** which is tuned to $$\frac{1}{R}$$

times the tuned frequency of the first filter **28*b***.

Each second filter 29 is constructed and operated similarly to first filter 28. Thus, filter **29*b* in unit B includes analogous items $L_2'$, $C_{s2}'$, $C_{p2}'$ and $\Delta C_{p2}'$. Inductor $L_2'$ and capacitor $C_{s2}'$ are connected in series between the output of divider 17*b* and ground. Capacitor $C_{p2}'$ is also connected between the output of divider 17*b* and ground; and capacitor $\Delta C_{p2}'$ is connected across capacitor $C_{p2}'$ by lead 32*a***.

First and second variable capacitors $C_{s2}'$ and $C_{p2}'$ are coupled to tuning shaft **23*b* of unit B. Third capacitor $\Delta C_{p2}'$ is coupled to tuning shaft 23*a*** in adjacent-prior unit A.

The output of second unit B is provided by a lead **27*b* to the mixer 26*c* of third dividing-digital unit C. Unit C is constructed identically to unit B. Thus, unit C has a first filter 28*c* connected to the output of its mixer 26*c* and has a second filter 29*c* connected to the output of its divider 17*c***.

First filter **28*c* is comprised of items $L_1''$, $C_{s1}''$, $C_{p1}''$ and $\Delta C_{p1}''$ which are connected together in precisely the same manner as the comparable items in filter 28*b*. That is, capacitor $C_{s1}''$ and inductor $L_1''$ are connected in series between ground and the output of mixer 26*c***, capacitor $C_{p1}''$ is connected across them, and capacitor $\Delta C_{p1}''$ is connected across $C_{p1}''$.

Thus, first and second capacitors $C_{s1}''$ and $C_{p1}''$ are coupled to the tuning shaft **23*c* in unit C, and the third capacitor $\Delta C_{p1}''$ is coupled to tuning shaft 23*b* in adjacent-prior unit B. This same sequence is provided for second filter 29*c* which is comprised of items $L_2''$, $C_{s2}''$, $C_{p2}''$ and $\Delta C_{p2}''$. Hence, items $C_{s2}''$ and $C_{p2}''$ are varied by the tuning shaft 23*c* of unit C and item $\Delta C_{p2}''$ is varied by the tuning shaft 23*b*** of unit B.

It can now be more specifically realized that an identical pattern follows for the construction of each filter in the second and all following digital units. This is the case, regardless of whether the following units be dividing-digital units, neutral-digital units, or multiplying-digital units, which are each defined in Patent No. 2,829,255. Neutral units and multiplying units are not described in this specification, since this is not necessary to the description of the present invention.

In Figure 1, there is shown only the first portion of a digital-frequency synthesizing means. Consequently, last unit C in Figure 1 is the prior-adjacent unit of a next following unit (not shown) which can be made identical in every respect to unit C. The first and second filters in that next unit will, therefore, have respective components $\Delta C_{p1}'''$ and $\Delta C_{p2}'''$ situated in unit C and tuned by shaft 23*c*.

The filters 28 and 29 are tunable over a two-to-one range in the invention by movement of the tuning shaft in their unit. A tuning difficulty, which then becomes apparent, but which is solved within practical limits by the invention, is that: on the one hand, each filter is tunable over a large range by the shaft of its given digital unit; but, on the other hand, its frequency must be deviated linearly by the tuning shaft of the adjacent-prior unit, regardless of the tuned frequency of the filter. The tuning of any adjacent-prior units is effected upon the tuning of a given unit by the capacitor $\Delta C_p$ operated by the shaft of the adjacent-prior unit.

The above-mentioned tuning difficulty becomes more specific when it is realized that capacitor $\Delta C_p$ is varied independently of the primary tuning of its filter network. In other words, capacitor $\Delta C_p$ is varied by its connected shaft without regard of the tuned frequency of its filter, since the filter is primarily tuned by the shaft connected to capacitor $C_s$ and $C_p$. The effort of capacitor $\Delta C_p$ upon tuning is a second-order one, but it is required to obtain precise tuning within practical limits. The required tuning range of effectiveness ($\Delta F_m$) of any capacitor $\Delta C_p$ upon its filter at any filter frequency F is:

$$\Delta F_m = \frac{1}{R} F \qquad (3)$$

Thus, as the radix (R) becomes large, the required range of effectiveness becomes smaller. Consequently, with a decade system where R is ten, the required range of effectiveness is one-fifth of a binary system where R is two. Due to certain approximations made in the functioning of capacitor $\Delta C_p$ (which appear later), this invention operates better with a decade system than with a binary one.

The particular filter arrangement provided by this invention obtains a minimum of components while maintaining a high degree of tuning preciseness, provided that the components of the invention are proportioned as taught below.

Since each filter is a parallel-resonant circuit, it will have a tuned frequency (F) primarily determined by the following expression (if the effects of capacitor $\Delta C_p$ are neglected at this time):

$$F = \frac{1}{2\pi\sqrt{L\frac{C_p C_s}{C_p + C_s}}} \qquad (4)$$

Expression 4 can be rewritten as:

$$4\pi^2 LF = \frac{1}{C_p} + \frac{1}{C_s} \qquad (5)$$

The incremental frequency change ($\Delta F$) due to an incremental capacitance change ($\Delta C_p$) in capaiitance $C_p$ of Expression 5 is obtained to a first-order approximation by differentiating (5) which yields:

$$8\pi^2 L\left(\frac{\Delta F}{\Delta C_p}\right)F = -\frac{1}{C_p^2} \qquad (6)$$

The above requirement for linearity between $\Delta F$ and $\Delta C_p$ is obtained by making the following condition:

$$\frac{\Delta F}{\Delta C_p} = -K \qquad (7)$$

where K is a constant, and the minus sign enables rationality in the resulting expressions. Substituting (7) in (6) and solving for $C_p$ gives:

$$C_p = \frac{1}{2\pi\sqrt{2LKF}} \qquad (8)$$

Then, substituting (8) into (5) and solving for $C_s$ yields:

$$C_s = \frac{1}{4\pi LF^2 - 2\pi\sqrt{2KLF}} \qquad (9)$$

The components of a filter made according to this invention are then specified by Expressions 3 through 9.

Due to limitations of the differentiation process, the above expressions are most accurate when $\Delta F$ is small compared to F. It can, therefore, be seen that the maximum variation required of $\Delta F$, which is $\Delta F_m$, defined by (3) above, becomes smaller as radix R is increased. Thus, it can be seen that the invention is more accurate for a decade system than for a binary system.

Figure 4:
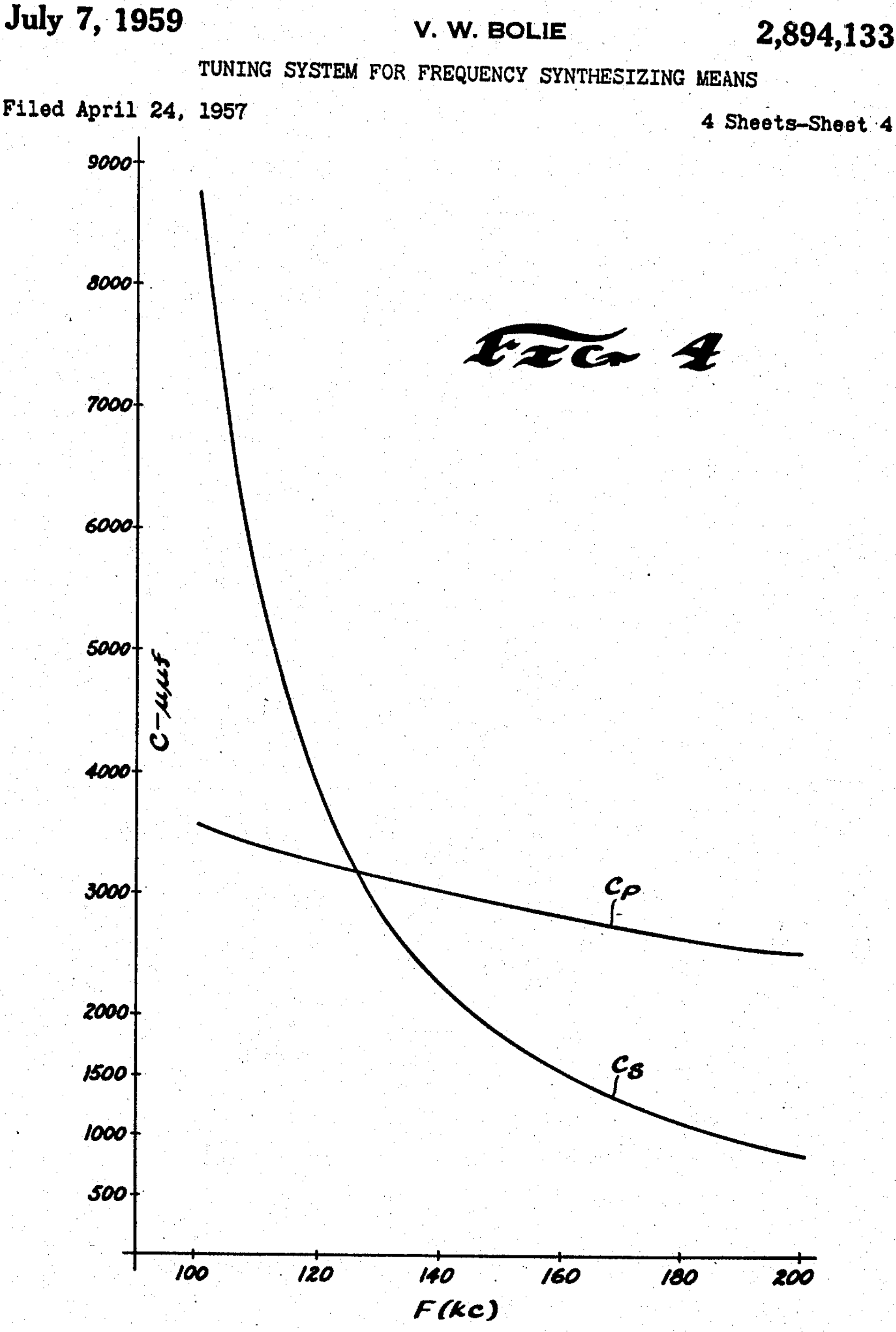

Figure 4 illustrates an exemplary relationship between the variation of capacitors $C_p$ and $C_s$ with the frequency F of the filter. Note that capacitance $C_p$ varies in a very nearly linear fashion. It can, therefore, be realized that incremental variations of capacitance $C_p$ by varying capacitor $\Delta C_p$ by the shaft of the adjacent prior unit obtains a linear second-order variation of frequency F, regardless of where frequency F is adjusted within its two-to-one range.

Insofar as this invention is concerned, the system illustrated in Figure 2 is the same as the system in Figure 1. The point brought out by Figure 2 is that the invention is just as adaptable to the modified type of synthesizing means as it is to the basic type in Figure 1. Consequently, filters 28 and 29 in Figure 2 are precisely the same as the comparable filters in Figure 1 and have the same reference character. The adaptation in Figure 2 is to a variable frequency type of synthesizing means of the type described in application Serial No. 575,379, which has a first unit V which includes a variable oscillator 66 that replaces unit A in Figure 1. The variable oscillator provides several advantages which are explained in the cited application. Its output connects to one input of mixer 26*b*. A direct shaft 34 couples a knob 36 to the oscillator to tune it to a first set of frequencies represented digitally on dial 37. A second knob 38 is connected to shaft 34 through a transmission 39, wherein movement of the knob 38 between two adjacent digits causes a full rotation by knob 36.

Variable oscillator 66 is the prior-adjacent unit to digital unit B and provides a second-order effect upon the tuning of filters in digital unit B in the same manner that unit A in Figure 1 effected a second-order effect upon the filters in its unit B. Tuning shaft 34 of oscillator 66 accordingly provides the same type of prior information for unit B in Figure 2 as is done by the tuning shaft 23*a* of unit A in Figure 1 for its unit B.

Figure 3:
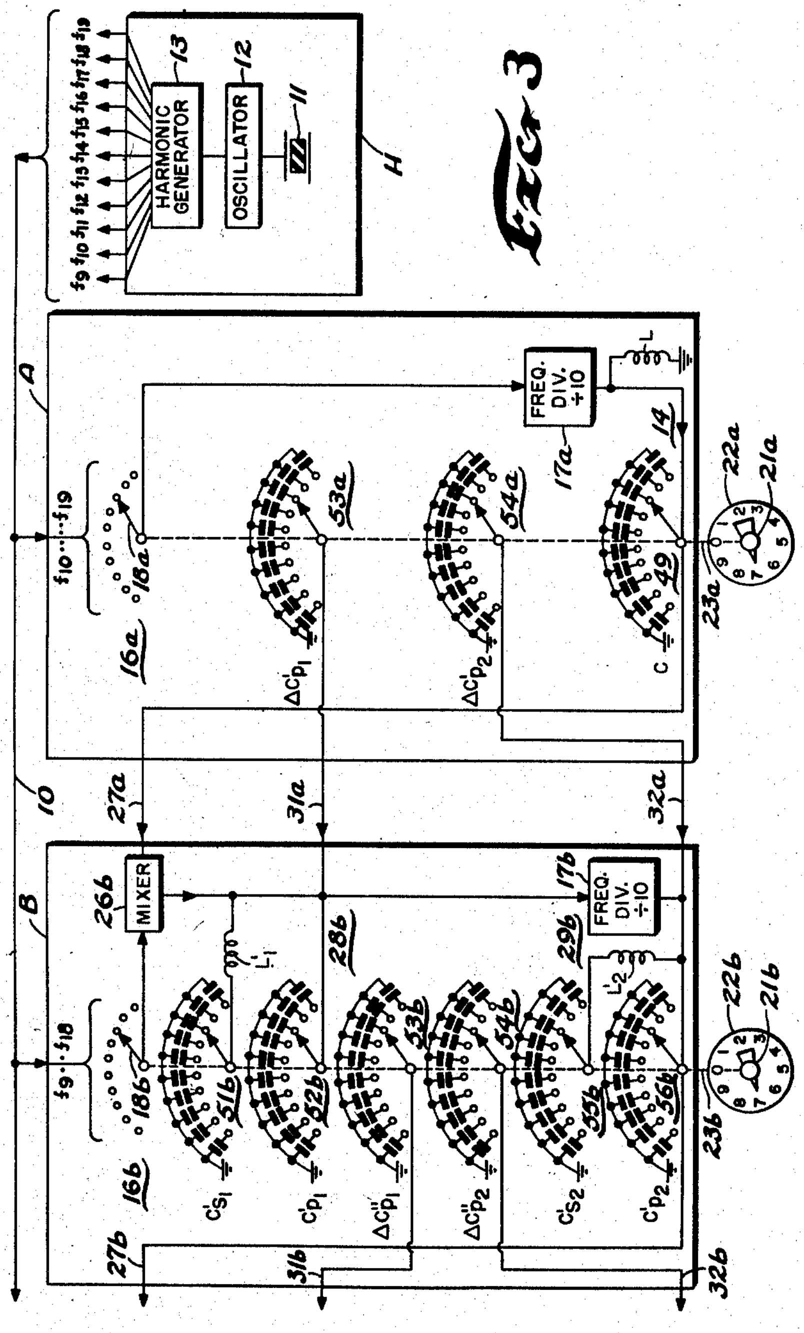
Figure 3 shows schematically filters made according to the invention utilizing switched banks of capacitors in the first two dividing units of a decade-frequency synthesizing means; and, Figure 4 is a diagram illustrating the capacitance variation in an exemplary filter made according to this invention.

It can be seen from Expressions 8 and 9 above that capacitance variations of capacitors $C_p$ and $C_s$ will not be linear with rotation of their connected tuning shaft. Accordingly, it may be simpler and more precise in some cases to replace each capacitor in Figure 1 or 2 with a bank of capacitors and a single-pole switch to select a single capacitor from the bank. Such use of banks of capacitors is particularly appropriate since each of the capacitors $C_s$, $C_p$, and $\Delta C_p$ are each tuned to only R number of discrete capacitances. Thus, each bank can be represented by R number of capacitors; and in a decade system, ten capacitors are used in each bank. Figure 3 illustrates a structural arrangement for a decade version of the invention, wherein each filter capacitor $C_s$, $C_p$ and $\Delta C_p$ is represented by a bank of ten capacitors and a single-pole switch.

Harmonic source H in Figure 3 includes a crystal 11 in an oscillator 12, and a harmonic generator 13 to provide the set of output harmonics $f_9$ through $f_{19}$. Within the set is a group $f_{d\ldots t}$ comprising frequencies $f_{10}$ through $f_{19}$ which are respectively connected to the ten stator contacts of switch 16*a*. The other group in the set is $f_{a\ldots k}$ comprising frequencies $f_{9\ldots 18}$ which are connected to the stator contacts of each switch 16 in second unit B and any following digital unit (not shown). In unit A, filter 14 is provided by inductance L and a bank of capacitors C which are respectively connected between ground and stator contacts of a single-pole switch 49. A lead 27*a* connects the output of filter 14 to mixer 26*b* in Figure 3 in the same manner as was done in Figure 1.

In second digital unit B, filter 28*b* is connected to the output of mixer 26*b*. Filter 28*b* is comprised of inductance $L_1'$, capacitor bank $C_{s_1}'$, capacitor bank $C_{p_1}'$, and capacitor bank $\Delta C_{p_1}'$ in unit A. A plurality of single-pole switches 51*b*, 52*b* and 53*a* are respectively provided with these capacitor banks. Each bank is connected between ground and the respective stator contacts of its switch. A lead 31*a* in Figure 3 connects between the poles of switches 52*b* and 53*a* to perform the same function as lead 31*a* in Figure 1. Shaft 23*b* of unit B is coupled to the poles of switches 51*b* and 52*b*; and tuning shaft 23*a* in unit A is coupled to the pole of switch 53*a*.

Second filter 29*b* in unit B is constructed in the same manner as filter 28*b* in Figure 3. Thus, filter 29*b* includes inductance $L_2'$, and capacitor banks $C_{s_2}'$, $C_{p_2}'$, and $\Delta C_{p_2}$. Separate single-pole switches 55*b*, 56*b* and 54*a* are provided respectively with the banks; wherein switches 55*b* and 56*b* are coupled to shaft 23*b*, and switch 54*a* is coupled to shaft 23*a*.

The additional banks of capacitors $\Delta C_{p_1}''$ and $\Delta C_{p_2}''$ with their associated switches 53*b* and 54*b* in unit B are portions of filters 28 and 29 (not shown) in the next following digital unit (not shown).

It is, therefore, realized that the invention can provide preciseness of tuning with relative simplicity in construction within the required limits of practicality and with elimination of mechanical items previously necessary.

Although this invention has been described with respect to particular embodiments thereof, it is not to be so limited as changes and modifications may be made therein which are within the full intended scope of the invention as defined by the appended claims.

I claim:

1. Tuning means for a frequency synthesizer having plural adjacent digital units, a generator means providing a plurality of harmonics coupled to each of said units, each of said units including a frequency mixer having one input connected to the frequency output of its adjacent prior unit, and means connecting its other input to a selected one of the harmonics of said generator means; any given one of said units having, a first parallel-resonant filter connected to the output of its mixer; said first filter including, an inductance, and a first adjustable capacitance connected in series, a second adjustable capacitance connected across said series-connected inductance and capacitance, said first and second capacitances coupled to the tuning shaft of the digital unit having their respective filter, and a third adjustable capacitance connected across said second capacitance and coupled to the tuning shaft of the adjacent prior unit; a frequency divider of the given unit having an input connected to the output of said first filter; and a second parallel-resonant filter of the given unit connected to the output of the frequency divider of said unit, said second filter including, an inductance, and a first capacitance connected in series with the divider output, a second adjustable capacitance connected across said series-connected inductance and capacitance, said first and second capacitances coupled to the tuning shaft of the given unit, and a third adjustable capacitance coupled to the tuning shaft of the adjacent prior unit, whereby the frequency output of said given unit is the output of said second filter.

2. Tuning means for a frequency synthesizer providing a frequency indication in a number system having the radix R, comprising at least a given digital-dividing unit, and a prior digital-dividing unit, means for generating harmonic frequencies coupled to each of said units, said given unit including a frequency mixer having a pair of inputs, with one input receiving a selected harmonic from said generating means, and its other input receiving the output of said prior digital unit; a first parallel-resonant filter connected to the output of the mixer of said given unit, a frequency divider coupled to the output of said first parallel-resonant filter, said divider dividing its received frequency by said radix R, a second parallel-resonant filter connected to the output of said divider to provide the output of said given digital unit; first and second tuning shafts provided with said given and prior digital units respectively; each of said parallel-resonant filters comprising, an inductance and a first adjustable capacitor means connected in series, a second adjustable capacitor means connected across said series-connected inductance and capacitor means, said first and second capacitor means coupled to said first tuning shaft and tuned therefrom, a third adjustable capacitor means connected in parallel across said second capacitor means, said third capacitor means coupled to said second tuning shaft; and the tuned frequency of said second filter being $$\frac{1}{R}$$

of the tuned frequency of the first filter.

3. Tuning means as defined in claim 2 wherein said first capacitor means is defined as a function of its filter's tuned frequency F by the expression $$\frac{1}{4\pi LF^2-2\pi\sqrt{2KLF}}$$

and said second capacitor means is defined as a function of frequency F by the expression $$\frac{1}{2\pi\sqrt{2LKF}}$$

in which L is said fixed inductance of the parallel-resonant filter and K is a constant, with said third capacitor means, varying linearly with frequency F.

4. A system as defined by claim 3 in which the radix R is ten.

5. Tuning means for a frequency synthesizer as defined in claim 2 in which each of said capacitor means comprises a bank of capacitors equal in number to the radix R, and a separate switching means being provided with each of said banks of capacitor means to connect one capacitor of its bank into its parallel-resonant filter, said switching means being coupled to the tuning shaft controlling its respective capacitor means.

6. Tuning means as defined in claim 5 wherein said first capacitor means is defined as a function of its filter's tuned frequency F that varies in digital steps according to the expression $$\frac{1}{4\pi LF^2-2\pi\sqrt{2KLF}}$$

and said second capacitor means is defined as a function of step-tuned frequency F by the expression $$\frac{1}{2\pi\sqrt{2LKF}}$$

in which L is the fixed inductance of the parallel-resonant filter, and K is a constant, with said third capacitor means varying linearly with equal increments of frequency F.

7. Tuning means for a frequency synthesizer having a digital output frequency indication in a number system of radix R, said synthesizer having a plurality of digital-dividing units, and a plurality of tuning shafts respectively coupled to said units, each tuning shaft controlling one digit of the output frequency indication, harmonic-generating means coupled to each of said digital units, each unit except the first including a frequency mixer having one input connected to the output of its adjacent prior unit, and having its other input receiving one of the harmonics from said harmonic-generating means, a first parallel-resonant filter in each unit coupled to the output of its mixer to select its first-order-summed-output frequency; a frequency divider coupled to the output of said first filter and dividing its received frequency by the radix R; a second parallel-resonant filter tuned to $$\frac{1}{R}$$

times the frequency of said first filter; each of said first and second parallel-resonant filters including, a first bank of R number of capacitors, each having one end connected to ground, a first single-pole switch having R number of contacts respectively connected to the opposite ends of the capacitors in said first bank, a fixed inductance connected between the pole of said first switch and the input of said filter, a second bank of R number of capacitors, each having one side connected to ground, a second single-pole switch having R number of contacts respectively connected to the ungrounded sides of the capacitors in said second bank, the pole of said second switch being also connected to the input of said filter, the poles of said first and second switches being coupled to the tuning shaft of the digital unit having said filter, a third bank of R number of capacitors, each having one end connected to ground, a third single-pole switch having R number of contacts respectively connected to the other sides of said capacitors in said third bank, the pole of said switch being also connected to the input to said filter, and the pole of said third switch being coupled to the tuning shaft of the digital unit that is adjacent and prior to the unit containing said filter; and the output of each of said digital units being provided from its second filter.

8. Tuning means as defined in claim 7 in which the capacitors in the first bank of each of said filters varies incrementally with the frequency F, which varies in equal digital intervals, as determined by the expression $$\frac{1}{4\pi LF^2-2\pi\sqrt{2KLF}}$$

and the capacitors in the second bank of each of said filters vary incrementally with the frequency F according to the expression $$\frac{1}{2\pi\sqrt{2LKF}}$$

in which L is said fixed inductance, and K is a constant, and the tuning shafts of said digital units varying linearly with frequency, and the capacitors in said third bank varying by equal increments as a function of frequency.

9. A system as defined in claim 8 in which said chosen number system is the decade system having a radix R equal to ten.

10. A system as defined in claim 8 in which the first unit of frequency synthesizer is a variable oscillator.

11. A system as defined in claim 8 in which the first digital unit includes a frequency divider receiving a selected harmonic from said harmonic generator, and a parallel-resonant circuit is coupled to the output of said frequency divider to provide the output of said first digital unit, with a tuning shaft for said first digital unit being coupled to its parallel-resonant circuit to tune it.

No references cited.